May 13, 1969     B. O. BUCKLAND     3,443,790
STEAM COOLED GAS TURBINE

Filed July 8, 1966

INVENTOR:
BRUCE O. BUCKLAND,
BY Robert J. Bird
HIS ATTORNEY.

INVENTOR:
BRUCE O. BUCKLAND,
BY Robert J. Bird
HIS ATTORNEY.

May 13, 1969  B. O. BUCKLAND  3,443,790
STEAM COOLED GAS TURBINE
Filed July 8, 1966

INVENTOR:
BRUCE O. BUCKLAND,
BY *Robert J. Bird*
HIS ATTORNEY.

United States Patent Office 3,443,790
Patented May 13, 1969

3,443,790
STEAM COOLED GAS TURBINE
Bruce O. Buckland, Schenectady, N.Y., assignor to General Electric Company, a corporation of New York
Filed July 8, 1966, Ser. No. 563,811
Int. Cl. F01d 5/04, 5/18
U.S. Cl. 253—39.1            6 Claims

ABSTRACT OF THE DISCLOSURE

Gas turbine having hollow rotor, stator, and casing members for the passage therethrough, near the working fluid surface thereof, of coolant steam.

---

The present invention relates generally to a gas turbine cooling system, and more particularly to a gas turbine having a rotor, stator, and gas inlet casing, all cooled by a novel system employing steam as the cooling medium.

It is known in the art to use air for gas turbine cooling. Its application is relatively straightforward since leak-tightness is not essential, deposits can be avoided, and air is always available for this use at the cycle pressure. However, calculations show that it is relatively ineffective. Because of the pumping and mixing losses which result from the direct communication of the cooling air and the working fluid, it is estimated that approximately only one-half of the improvement in net power which results from the higher firing temperatures allowed by the cooling can be realized.

It is also known in the art to cool a turbine by the use of water. Theoretically, firing temperatures in excess of 2200° F. and a reduction of only three or four percent in the theoretical increase in power due to cooling are possible. However, the associated problems that can arise from the use of water cooling such as deposits, corrosion, thermal stresses, instabilities of rotating liquids, and the requirement of leak tightness under pressures of 4000 to 7000 p.s.i. have made the problems of implementing a liquid cooled gas turbine very difficult.

It is an object, therefore, of the present invention to provide a gas turbine with a cooling system which overcomes the limitations of the aforementioned air and water cooling systems. That is, a gas turbine cooling system providing substantially greater gains than are attainable with air, and without the operation and maintenance difficulties resulting from the use of water.

It is another object of the present invention to provide a gas turbine having a reliable and practical cooling system permitting operating temperatures on the order of 2200° F. or higher.

Other objects, advantages and features of the present invention will become apparent from the following description when taken in connection with the accompanying drawing.

Briefly stated, the present invention is practiced in one form by a steam cooled gas turbine. The turbine rotor shaft is hollow having steam inlet and outlet passages therein. In each of the rotor wheels, is a plurality of radial steam passages extending to the individual rotor buckets. The buckets also define radial steam passages such that steam flow from the interior of the rotor shaft and radially outward through the turbine wheel and turbine bucket is returned through the bucket, rotor wheel and rotor shaft, to the steam outlet. The turbine stator likewise has substantially radial passages within the stator nozzles such that steam coolant is caused to flow radially towards the tips of the nozzles and returned radially to a steam outlet. The turbine inlet scroll or casing is an annulus essentially defined by coolant tubes fastened together in a close array and having steam coolant passing therethrough.

In the drawing:

FIG. 4 is a radial view looking inward on the rotor wheels at line IV—IV of FIG. 2.

Figure 1:
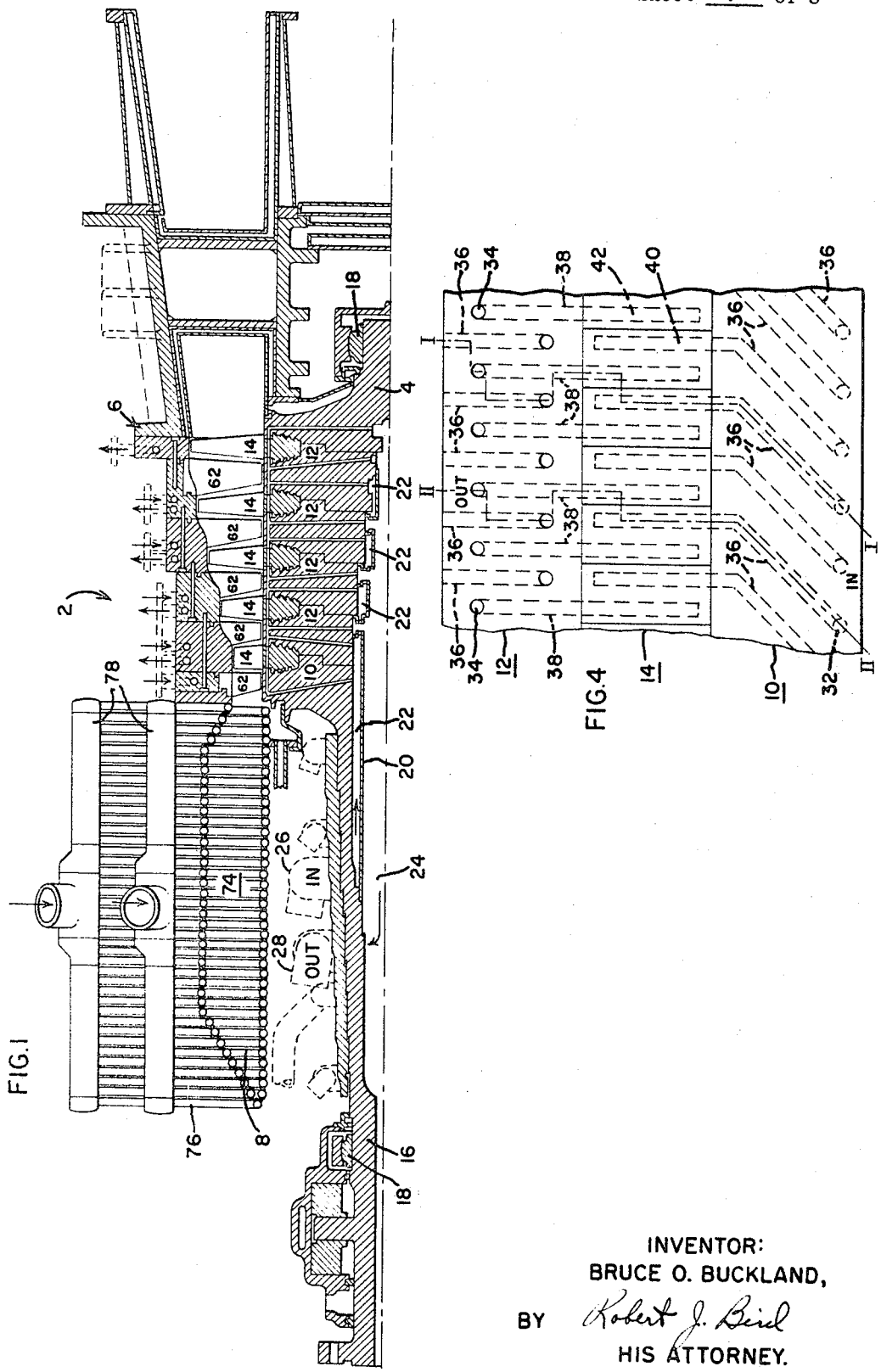
FIG. 1 is an elevation view above the center line and partly in section, of a gas turbine according to the present invention.

Referring now to FIG. 1, a gas turbine generally indicated at 2 comprises a rotor 4, a stator 6, and a turbine inlet casing or scroll 8.

ROTOR

The rotor 4 includes a first stage rotor wheel 10 and downstream rotor wheels 12 having individual rotor buckets 14 mounted peripherally around the wheels, the wheels 10 and 12 forming a part of rotor shaft 16. Rotor shaft 16 is mounted between rotor bearings 18. The shaft 16 is hollow and contains a flow segregating pipe 20 concentrically disposed therein, which pipe 20 defines with the rotor shaft 16 an inlet flow annulus 22 and an outlet flow conduit 24. A stationary fluid inlet connection 26 is mounted by a suitable gland sealing means (not shown) in communication with rotor fluid inlet flow annulus 22. Similarly, a stationary fluid outlet connection 28 is mounted by suitable gland sealing means (not shown) in communication with rotor outlet flow conduit 24.

The fluid inlet flow annulus 22, though shown as separate chambers on the drawing, is a common conduit with the separately shown spaces in common communication intermittently around the rotor shaft.

Figure 2:
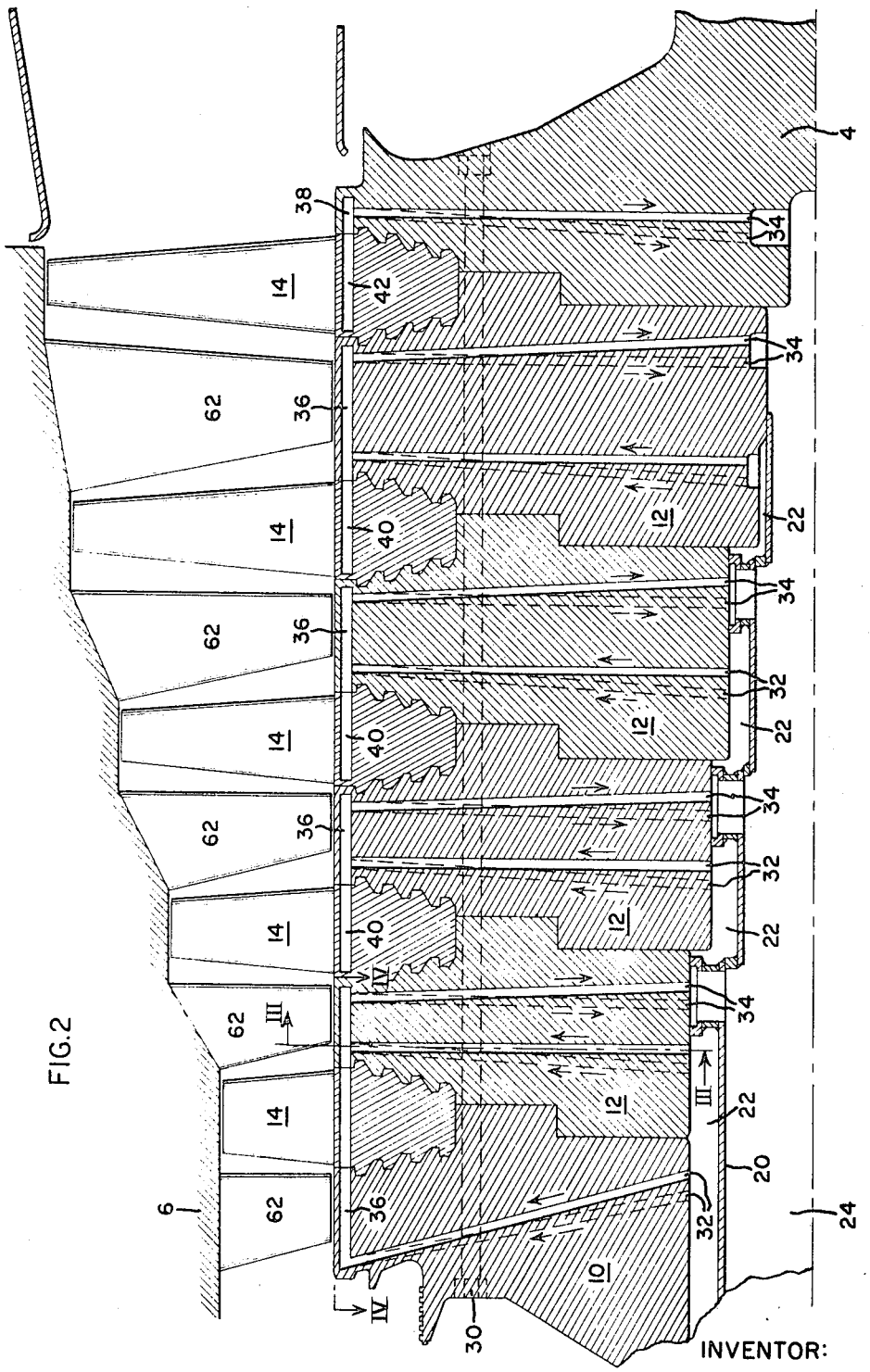
FIG. 2 is an enlarged elevation view above the center line similar to FIG. 1 showing the turbine stages of the present invention.
Figure 3:
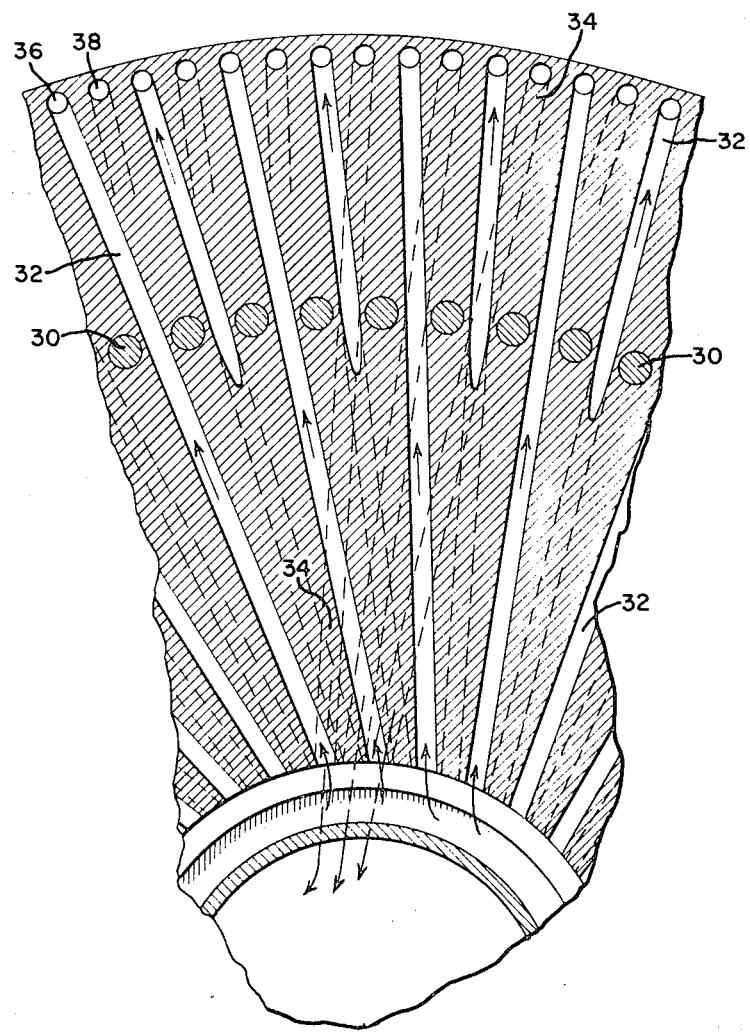
FIG. 3 is a sectional view taken along the line III—III of FIG. 2.
Figure 5:
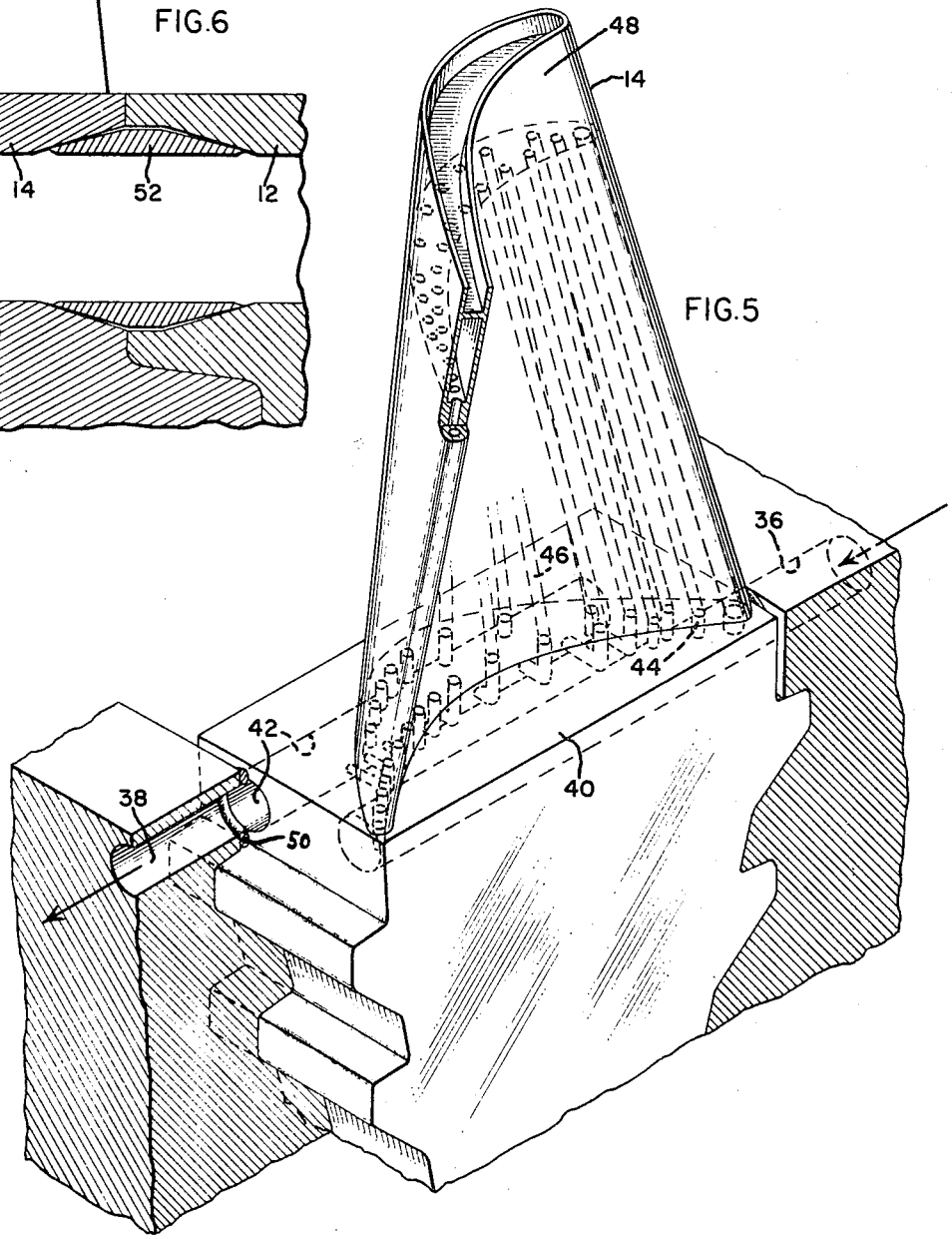
FIG. 5 is a perspective view of an individual rotor bucket mounted between rotor wheels.

Referring now to FIG. 2, the first stage rotor wheel 10 and the downstream rotor wheels 12 are held together by a plurality of tie bolts 30 spaced in a cylindrical array around the rotor. The individual rotor buckets 14 are mounted by dovetails between adjacent rotor wheels. Rotor wheels 10 and 12 define coolant inlet passages 32 therein which communicate with the fluid inlet flow annulus 22, and extend in a substantially radial direction toward the rotor wheel periphery just under the surface thereof. Similarly, the rotor wheels 10 and 12 define coolant outlet passages 34 which communicate with outlet flow conduit 24 and extend in a substantially radial direction toward the rotor wheel periphery just under the surface thereof. As shown in FIG. 3, these passages are positioned alternately between tie bolts 30. Furthermore, and as shown in FIG. 2, passages 32 and 34 are axially staggered at their radial inner ends. This is done to avoid stress concentrations in the rotor wheels that would result if the holes were allowed to intersect one another at acute angles at their radial inner extremities. At their radially outer ends, coolant passages 32 and 34 communicate with longitudinally extending passages 36 and 38 respectively near the periphery of the rotor wheels (see FIG. 4), thus surrounding the rotor by an array of coolant passages. Longitudinally extending passages 36 communicate with coolant inlet passages 32, and longitudinally extending passages 38 communicate with coolant outlet passages 34. The bases of individual rotor buckets 14 likewise have longitudinal passages or manifolds 40, 42 which communicate with the longitudinal passages 36 and 38 in the wheels. Bucket manifolds 40 communicate with inlet passages 36, and bucket manifolds 42 communicate with outlet passages 38. These features are more clearly shown in FIGS. 4 and 5. At this point it should be pointed out that the rotor wheel passages and bucket manifolds shown in FIGS. 1 and 2 are shown as they would appear in sectional views along lines I—I and II—II respectively in FIG. 4. They do not actually lie in the same plane.

Each individual rotor bucket 14 has a plurality of passages 44 and 46 therein extending lengthwise therealong and communicating in the dovetail region with the bucket manifolds 40 and 42 respectively. At their other ends, near the tip portion of the rotor buckets, is a hollow chamber 48 which communicates in common with the bucket passages 44 and 46. The joints between wheel passages 36 and 38 and bucket manifolds 40 and 42, are sealed by O-rings 50. Tie bolts 30 provide the tension holding the rotor wheels and buckets together, and thus also provide a positive sealng force on O-rings 50.

Figure 6:
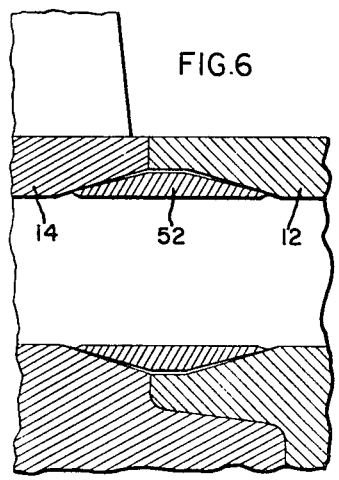
FIG. 6 is a sectional view of a modification of the sealing means shown in FIG. 5.

Alternatively, in a modification, a tubular insert type of seal as shown in FIG. 6 may be used. In this figure, the rotor wheel 12 and the individual rotor bucket 14 have their junctures suitably prepared for the insertion of tubular insert 52 which is effective to seal the flow passages.

The operation of the above-described rotor cooling system is as follows. Coolant steam, as, for example, steam at 600 p.s.i. and 550° F. from an external source, is introduced at inlet connection 26 from which it flows through inlet flow annulus 22, radially through the rotor wheels coolant inlet passages 32, along the wheel peripheries through passages 36, into rotor bucket manifolds 40, and radially to the bucket tips through passages 44 and into the common chambers 48 at the rotor bucket tips. From common chambers 48, the return flow is through bucket radial passages 46, bucket outlet manifolds 42, wheel periphery passages 38, wheel radial outlet passages 34, into the rotor shaft outlet flow condiut 24 which discharges into the outlet connection 28.

Thus the steam flow cooling a given stage of buckets is radially outward through the upstream (or hotter) wheel holding the upstream side of the individual bucket bases, through the bucket passages, and then radially inward through the downstream (or cooler) adjacent wheel holding the other side of the bucket bases. The same pattern is followed for the next stage of buckets with the cool incoming steam passages in the wheel crisscrossing but upstream of the radial exhaust passages in the same wheel. The steam flow is of a sufficient quantity to maintain the temperature of the first stage rotor wheel periphery at 1200° F. or below and the temperature of the first stage rotor buckets at 1400° F. or below.

STATOR

Figure 7:
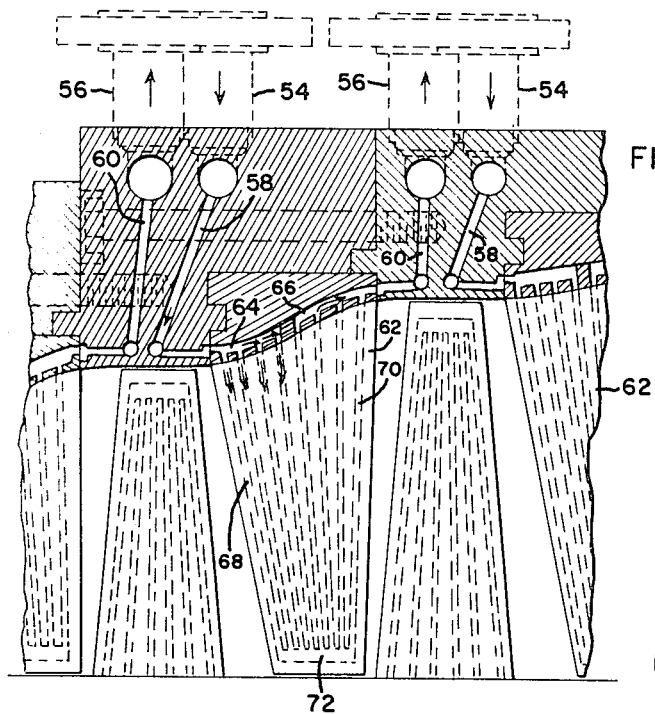
FIG. 7 is a partial sectional elevation of the turbine stator.

The stator of the gas turbine of the present invention is partly shown in detail in FIG. 7. It includes a series of coolant inlet connections 54 and a series of coolant outlet connections 56. Stator coolant inlet passages 58 communicate with inlet connections 54, and stator coolant outlet passages 60 communicate with coolant outlet connections 56. Stator nozzles or vanes 62 and mounted circumferentially around the stator 6 by root portions held between the annular casing members and extend radially inwardly therefrom. Nozzles 62 have inlet chambers 64 and outlet chambers 66 in their root portions. At the tips of nozzles 62 is a chamber 72 which communicate by way of passages 68 with inlet chamber 64 and by way of passages 70 with outlet chamber 66. Stator inlet passages 58 communicate with inlet chambers 64, and outlet chambers 66 communicate with outlet passages 60.

In operation, coolant steam from the same external source as that supplying the rotor coolant system is taken in at inlet connections 54, and circulated by way of passages 58, inlet chambers 64, radial passages 68, chamber 72, radial passages 70, outlet chamber 66, and outlet passages 60 to outlet connections 56, whereby the stator nozzles 62 are cooled. The steam flow is of a sufficient quantity to maintain the first stage stator nozzles at a temperature of 1600° F., or below.

Similar to the rotor flow pattern, the steam enters in the upstream annular casing member holding one side of the nozzle base, flows through the nozzle passages, and then leaves from the downstream annular member holding the other side of the nozzle base.

INLET CASING

Figure 8:
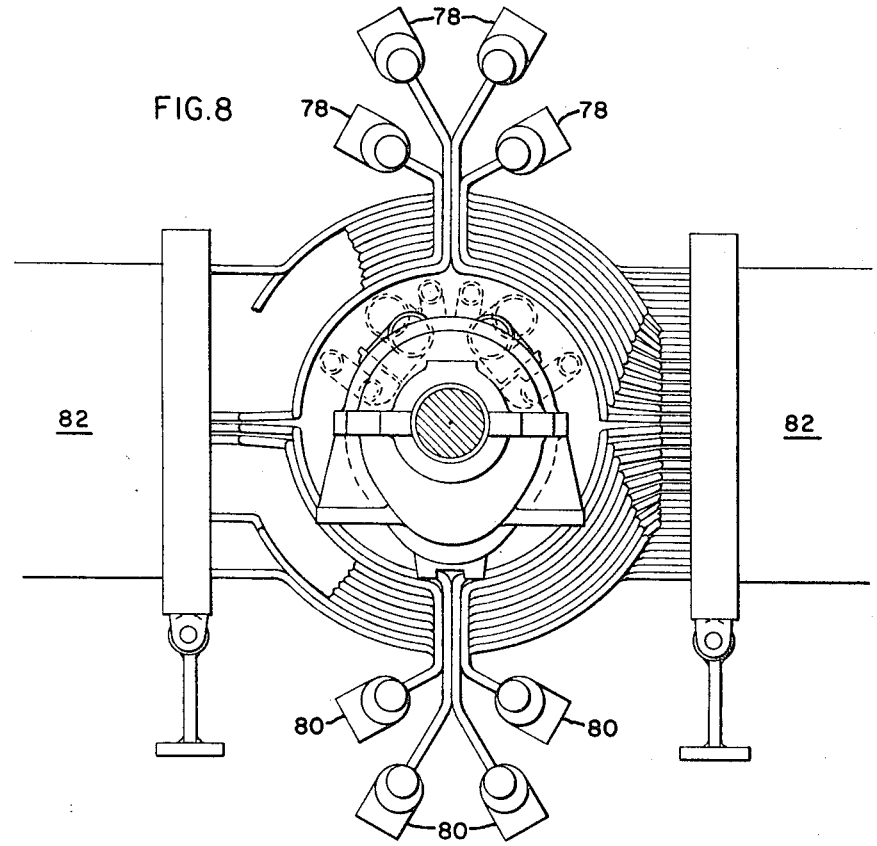
FIG. 8 is an axial view of the turbine inlet casing of the present invention.

The turbine inlet casing 8 is shown in FIG. 1 in its relation to the rest of the turbine, and is shown in an end view in FIG. 8. The inlet casing 8 is essentially an annular chamber for the purpose of feeding combustion gases to the working members of the turbine. Annular chamber 74 of inlet casing 8 is defined by coolant tubes 76 which are welded closely together, separated only by thin webs or fins. Coolant tubes 76 connect inlet steam manifolds 78 at the top of the assembly with outlet steam manifolds 80 at the bottom thereof. Hot gases which constitute the motive fluid for the turbine enter the inlet casing annulus at inlet 82, one being on each side of the casing. The hot gases may be generated in conventional combustion chambers not material to this invention. The interior of the inlet casing 74 communicates directly with the motive fluid path within the turbine. That is to say that the hot gases entering the annular chamber 74 are exhausted therefrom and expanded through the turbine. Within the tubes 76, coolant steam flows from inlet manifolds 78 to outlet manifolds 80 in sufficient quantity to maintain the casing temperature at or below 1200° F.

While the working members in typical gas turbines of the prior art are subjected to gas temperatures on the order of 1600° F., the present invention permits operation of the turbine with gases having temperatures on the order of 2200° F., while keeping critical parts at temperatures on the order of those to which they would be subjected in the typical prior art gas turbines mentioned above.

It will thus be appreciated that a gas turbine cooling system has herein been described which overcomes the limitations of air and water cooling systems of the prior art and which provides a practical means for permitting gas turbines to operate on gases of substantially increased temperatures.

It will occur to others of ordinary skill in the art to make modifications of the present invention which will lie within the concept and scope thereof. Accordingly, it is intended that the present invention be not limited by the details in which it has been described but that it encompass all within the purview of the following claims.

What is claimed is:

1. A turbine rotor for expanding a first motive fluid to obtain energy therefrom and having a shaft and a plurality of rotor wheels with a plurality of individual buckets mounted therearound, said rotor wheels being bolted together with said buckets dovetailed between adjacent wheels, said shaft defining longitudinal coolant inlet and outlet passages through a part thereof, said rotor wheels defining coolant inlet and outlet passages in communication with said longitudinal inlet and outlet passages respectively, and extending toward the peripheries of said wheels, each of said buckets defining an inlet and an outlet manifold in its root portion and a common chamber in its tip portion, said inlet and outlet manifolds being in communication with said rotor wheel inlet and outlet passages respectively, and said common chamber communicating through a plurality of bucket passages with said inlet and outlet manifolds, the inlet manifolds of said buckets communicating with the coolant inlet passages in the rotor wheel upstream of said buckets with respect to the flow of said first fluid and the outlet manifolds of said buckets communicating with the coolant outlet passages in the rotor wheel downstream of said buckets, means to admit steam from an external source to said shaft inlet passage and means to emit steam from said shaft outlet passage.

2. A turbine rotor according to claim 1 in which the bolts holding said rotor wheels together are tensioned to urge said wheels and said individual buckets into close relationship to mutually seal said passages and manifolds.

3. A turbine rotor according to claim 1 in which said inlet and outlet manifolds are substantially parallel and alternately spaced in circumferential array relative to the axis of said rotor.

4. A turbine rotor according to claim 1 in which said coolant inlet and outlet passages in said rotor wheels are staggered in an axial direction at their radially innermost ends, the inlet passages also lying axially spaced upstream from the outlet passages in each wheel.

5. A steam cooled gas turbine including:
  (a) a rotor having a shaft and a plurality of rotor wheels with a plurality of individual buckets mounted therearound,
  said rotor wheels being bolted together with said buckets dovetailed between adjacent wheels,
  said shaft defining longitudinal steam inlet and outlet passages through a part thereof,
  said rotor wheels defining steam inlet and outlet passages in communication with said longitudinal inlet and outlet passages respectivelly, and extending toward the peripheries of said wheels,
  each of said buckets defining an inlet and an outlet manifold in its root portion and a common chamber in its tip portion, said inlet and outlet manifolds being in communication with said rotor wheel inlet and outlet passages respectively, and said common chamber communicating through a plurality of bucket passages with said inlet and outlet manifolds, the inlet manifolds of said buckets communicating with the coolant inlet passages in the rotor wheel upstream of said buckets with respect to the flow of said first fluid and the outlet manifolds of said buckets communicating with the coolant outlet passages in the rotor wheel downstream of said buckets,
  means to admit steam from an external source to said shaft inlet passage and means to emit steam from said shaft outlet passage,
  (b) a stator having individually mounted nozzles disposed circumferentially around the inside thereof,
  said stator defining steam inlet and outlet passages therein,
  each of said nozzles defining steam inlet and outlet passages therein and a chamber in its tip portion which is in common communication with said nozzle inlet and outlet passages,
  said nozzle inlet and outlet passages communicating respectively with said stator inlet and outlet passages,
  said stator and nozzle inlet passages located upstream of said stator and nozzle outlet passages with respect to the flow of the first fluid,
  means to admit steam to said stator coolant inlet passage and means to emit steam from said stator coolant outlet passage, and
  (c) a gas inlet casing comprising coolant tubes in close array substantially defining a chamber,
  each of said tubes communicating at one end thereof with a steam inlet manifold and at the other end thereof with a steam outlet manifold,
  said chamber disposed in communication with a source of turbine working fluid and with the working fluid path of said turbine.

6. A multistage gas turbine rotor including a shaft and a plurality of rotor wheels to accommodate individual buckets therearound,
  said rotor wheels being bolted together with said buckets dovetailed between adjacent wheels,
  said shaft defining longitudinal coolant inlet and outlet passages through a part thereof,
  said rotor wheels defining coolant inlet and outlet wheel passages which communicate at their inner ends with said longitudinal inlet and outlet passages respectively and which extend toward the peripheries of said wheels, said wheel passages being disposed in a substantially axial direction at the wheel peripheries,
  each of said buckets defining parallel inlet and outlet manifolds in its dovetail portion and a common chamber in its tip portion, said bucket manifolds extending in a substantially axial direction, the inlet manifolds of said buckets communicating with the coolant inlet passages in the rotor wheel upstream thereof with respect to gas flow, and the outlet manifolds of said buckets communicating with the coolant outlet passages in the rotor wheel downstream thereof, said common chamber being in communication through a plurality of passages with both of said bucket manifolds,
  sealing means between said wheels and said buckets where said manifolds communicate with said wheel passages, and
  means to motivate coolant steam into the longitudinal inlet passage in said shaft.

References Cited

UNITED STATES PATENTS

| | | | |
|---|---|---|---|
| 1,938,688 | 12/1933 | Brooke | 253—39.15 X |
| 2,073,605 | 3/1937 | Belluzzo | 253—39.15 |
| 2,618,120 | 11/1952 | Papini | 253—39.15 X |
| 2,778,601 | 1/1957 | Eckert | 253—39.15 |
| 2,883,151 | 4/1959 | Dolida | 253—39.15 |
| 2,977,090 | 3/1961 | McCarthy et al. | 253—39.15 |
| 1,494,354 | 5/1924 | Guy | 253—1 |
| 1,657,192 | 1/1928 | Belluzzo. | |
| 2,667,326 | 1/1954 | Ledinegg. | |

FOREIGN PATENTS 897,716  6/1944  France.

EVERETTE A. POWELL, Jr., *Primary Examiner.*

U.S. Cl. X.R.

253—39.15